US012140040B2

(12) United States Patent
Kuropatwa et al.

(10) Patent No.: US 12,140,040 B2
(45) Date of Patent: Nov. 12, 2024

(54) AIRFOIL ASSEMBLY WITH A DIFFERENTIALLY ORIENTED STAGE

(71) Applicants: General Electric Company, Schenectady, NY (US); General Electric Company Polska Sp. z o.o., Warsaw (PL)

(72) Inventors: Michal Tomasz Kuropatwa, Warsaw (PL); John Douglas Mickol, Cincinnati, OH (US); Adam Wojciech Deskiewicz, Warsaw (PL)

(73) Assignees: General Electric Company, Evendale, OH (US); General Electric Company Polska Sp. z o.o., Warsaw (PL)

( * ) Notice: Subject to any disclaimer, the term of this patent is extended or adjusted under 35 U.S.C. 154(b) by 0 days.

(21) Appl. No.: 17/839,859

(22) Filed: Jun. 14, 2022

(65) Prior Publication Data
US 2023/0250723 A1 Aug. 10, 2023

(30) Foreign Application Priority Data
Feb. 7, 2022 (PL) ......................................... 440316

(51) Int. Cl.
*F01D 5/14* (2006.01)
*F01D 25/28* (2006.01)

(52) U.S. Cl.
CPC ............. *F01D 5/141* (2013.01); *F01D 25/28* (2013.01); *F05D 2260/961* (2013.01)

(58) Field of Classification Search
CPC ..... F01D 5/141; F01D 25/28; F05D 2260/961
See application file for complete search history.

(56) References Cited

U.S. PATENT DOCUMENTS

| 3,745,629 | A | 7/1973 | Pask et al. |
| 4,172,361 | A | 10/1979 | Kronogard |
| 5,966,525 | A | 10/1999 | Manzi, Jr. et al. |

(Continued)

FOREIGN PATENT DOCUMENTS

| EP | 3290643 A1 * | 3/2018 | ............. F01D 5/141 |
| JP | 2012241580 A | 12/2012 | |

OTHER PUBLICATIONS

Machine Translation of EP3290643A1 PDF file name: "EP3290643A1_Machine_Translation.pdf".*

*Primary Examiner* — Grant Moubry
*Assistant Examiner* — Ruben Picon-Feliciano
(74) *Attorney, Agent, or Firm* — Dority & Manning, P.A.

(57) ABSTRACT

An airfoil assembly for a gas turbine engine includes: an inner support structure configured to circumscribe a longitudinal axis of the gas turbine engine; an outer support structure configured to circumscribe the longitudinal axis of the gas turbine engine, the outer support structure circumscribing the inner support structure; and a stage including a plurality of airfoils extending from the inner support structure towards the outer support structure, the plurality of airfoils including: a first airfoil defining a first sweep angle, a first axial position, and a first lean angle; and a second airfoil defining a second sweep angle, a second axial position, and a second lean angle, wherein the second sweep angle is different than the first sweep angle, the second axial position is different than the first axial position, the second lean angle is different than the first lean angle, or a combination thereof.

19 Claims, 7 Drawing Sheets

(56) References Cited

U.S. PATENT DOCUMENTS

| | | |
|---|---|---|
| 6,726,445 B2 | 4/2004 | Tsuchiya et al. |
| 7,547,186 B2 | 6/2009 | Schuster et al. |
| 7,891,943 B2 | 2/2011 | Tsuchiya et al. |
| 9,121,284 B2 | 9/2015 | Pope |
| 9,540,938 B2 | 1/2017 | Topol et al. |
| 10,107,191 B2 | 10/2018 | Gilson et al. |
| 10,233,758 B2 | 3/2019 | Duong et al. |
| 10,233,948 B2 | 3/2019 | Topol et al. |
| 2008/0014091 A1 | 1/2008 | Gentile et al. |
| 2012/0057981 A1* | 3/2012 | Nash ................ F01D 5/143 416/223 A |
| 2013/0219922 A1 | 8/2013 | Gibson et al. |
| 2016/0010487 A1 | 1/2016 | Breeze-Stringfellow et al. |
| 2016/0090909 A1* | 3/2016 | Gilson ................ F02K 3/06 415/208.2 |
| 2016/0146040 A1 | 5/2016 | Simpson et al. |
| 2019/0242406 A1 | 8/2019 | Wood et al. |
| 2020/0032654 A1 | 1/2020 | Stonjek |
| 2021/0381431 A1* | 12/2021 | Kupratis ............ F02K 3/068 |

\* cited by examiner

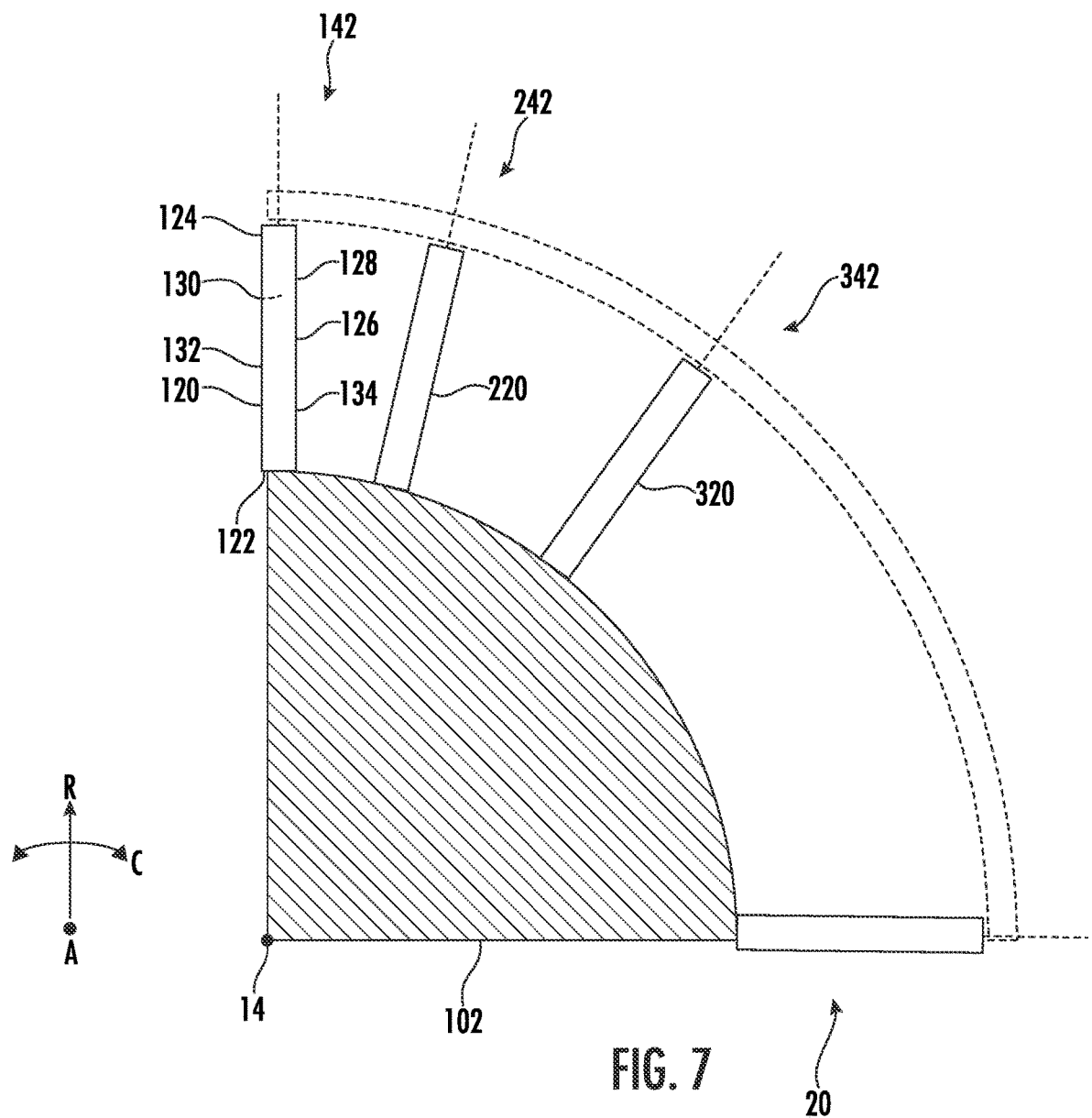

AIRFOIL ASSEMBLY WITH A DIFFERENTIALLY ORIENTED STAGE

PRIORITY INFORMATION

The present application claims priority to Poland Patent Application Number P.440316 filed on Feb. 7, 2022.

FIELD

The present subject matter relates generally to components of a gas turbine engine, or more particularly to a stator airfoil assembly for a gas turbine engine.

BACKGROUND

A gas turbine engine generally includes a fan and a turbomachine arranged in flow communication with one another. Additionally, the turbomachine of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

The fan is driven by the turbomachine. The fan includes a plurality of circumferentially spaced fan blades extending radially outward from a rotor disk. Rotation of the fan blades creates an airflow through the inlet to the compressor section of the turbomachine, as well as an airflow over the turbomachine. For certain engines, a plurality of outlet guide vanes are provided downstream of the fan for straightening the airflow from the fan to increase, e.g., an amount of thrust generated by the fan.

Improvements to the outlet guide vanes of a gas turbine engine, as well as to other airfoil assemblies within a gas turbine engine, would be welcomed in the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 7 is a schematic, cross-sectional view of a stage of an airfoil assembly in accordance with another exemplary aspect of the present disclosure.

Figure 1:
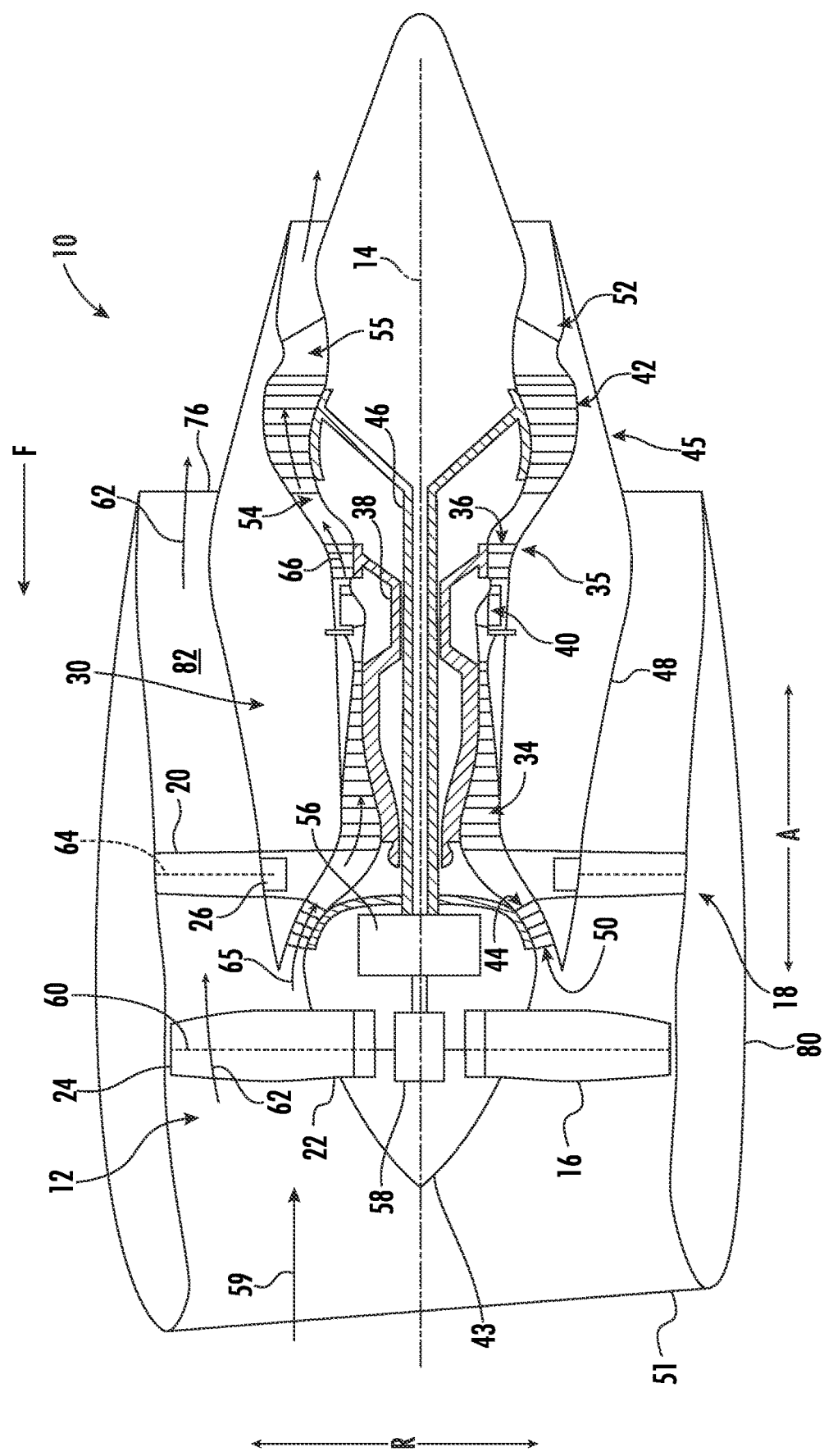
FIG. 1 is a schematic, cross-sectional view of an exemplary, ducted gas turbine engine according to various embodiments of the present subject matter.

Repeat use of reference characters in the present specification and drawings is intended to represent the same or analogous features or elements of the present subject matter.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The terms "forward" and "aft" refer to relative positions within a turbomachine, gas turbine engine, or vehicle and refer to the normal operational attitude of the same. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled", "fixed", "attached to", and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially" are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

A "third stream" as used herein means a non-primary air stream capable of increasing fluid energy to produce a minority of total propulsion system thrust. The third stream may generally receive inlet air (air from a ducted passage downstream of a primary fan) instead of freestream air (as the primary fan would). A pressure ratio of the third stream may be higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, and 86 degree Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide airfoils, valves, variable exhaust geometry, or fluidic features) to adjust or optimize overall system performance across a broad range of potential operating conditions.

The term "turbomachine" or "turbomachinery" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine.

In certain aspects of the present disclosure, an airfoil assembly for a turbomachine is provided. The airfoil assembly generally includes an inner support structure and a plurality of airfoils extending outward along a radial direction (R) with respect to the inner support structure. Generally, at least one of the airfoils of the stage is oriented differently with respect to one or more of the other airfoils of the stage, such as different sweep angles, different lean angles, and/or different axial positions.

In certain exemplary embodiments, two or more of the airfoils of the stage may be oriented differently such that the dynamic pressure profiles associated with the airfoils and/or rotor blades of the turbomachine interact in order to reduce a sound profile produced by the airfoil assembly or attenuated through the airfoil assembly (produced from an upstream source, such as an upstream rotor assembly).

In certain additional or alternative exemplary embodiments, the airfoil assembly may further include an outer support structure. For example, the airfoil assembly may be utilized in a ducted gas turbine engine. In such embodiments, the airfoils may generally extend between the inner support structure and the outer support structure. With such a configuration, at least one of the airfoils of the stage may be configured differently such that an airfoil array stiffness of the airfoil assembly falls within a predetermined range.

Referring now to the Drawings, FIG. 1 shows an elevational, cross-sectional view of an exemplary embodiment of a gas turbine engine as may incorporate one or more inventive aspects of the present disclosure. In particular, the exemplary gas turbine engine of FIG. 1 is a configured as a single rotor, ducted engine 10 defining an axial direction A, a radial direction R, and a circumferential direction C (extending about the axial direction A; see, e.g., FIG. 3). As is seen from FIG. 1, engine 10 takes the form of a closed rotor propulsion system and has a rotor assembly 12 (e.g., a fan assembly) which includes an array of airfoils arranged around a central longitudinal axis 14 of engine 10, and more particularly includes an array of rotor blades 16 arranged around the central longitudinal axis 14 of engine 10. Moreover, as will be explained in more detail below, the engine 10 additionally includes a non-rotating airfoil assembly 18 positioned aft of the rotor assembly 12 (i.e., non-rotating with respect to the longitudinal axis 14), which includes an array of airfoils 20 (e.g., outlet guide vanes) also disposed around longitudinal axis 14.

The rotor blades 16 are arranged in typically equally spaced relation around the central longitudinal axis 14, and each blade has a root 22 and a tip 24 and a span defined therebetween. Similarly, the airfoils 20 are also arranged in typically equally spaced relation around the central longitudinal axis 14, and each has a root and a tip and a span defined therebetween. The rotor assembly 12 further includes a hub 43 located forward of the plurality of rotor blades 16.

Additionally, the engine 10 includes a turbomachine 30, which, in the exemplary embodiment, includes a low speed system and a high speed system. The high speed system of the turbomachine 30 generally includes a high speed compressor 34, a high speed turbine 36, and a high speed shaft 38 extending therebetween and connecting the high speed compressor 34 and high speed turbine 36. The high speed compressor 34 (or at least the rotating components thereof), the high speed turbine 36 (or at least the rotating components thereof), and the high speed shaft 38 may collectively be referred to as a high speed spool 35 of the engine. Further, a combustion section 40 is located between the high speed compressor 34 and high speed turbine 36. The combustion section 40 may include one or more configurations for receiving a mixture of fuel and air and providing a flow of combustion gasses through the high speed turbine 36 for driving the high speed spool 35.

The low speed system similarly includes a low speed turbine 42, a low speed compressor or booster 44, and a low speed shaft 46 extending between and connecting the low speed compressor 44 and low speed turbine 42. The low speed compressor 44 (or at least the rotating components thereof), the low speed turbine 42 (or at least the rotating components thereof), and the low speed shaft 46 may collectively be referred to as a low speed spool 45 of the engine.

Referring still to FIG. 1, the turbomachine 30 is generally encased in a cowl 48. Moreover, it will be appreciated that the cowl 48 defines at least in part an inlet 50 and a jet exhaust nozzle section 52 and includes a core flowpath 54 extending between the inlet 50 and the jet exhaust nozzle section 52. The inlet 50 is for the embodiment shown an annular or axisymmetric 360 degree inlet located between the rotor blade assembly 12 and the fixed or stationary outlet guide vane assembly 18 and provides a path for incoming atmospheric air to enter the core flowpath 54 (and compressors 44, 34, combustion section 40, and turbines 36, 42) inwardly of the airfoils 20 along the radial direction R. Such a location may be advantageous for a variety of reasons, including management of icing performance as well as protecting the inlet 50 from various objects and materials as may be encountered in operation. However, in other embodiments, the inlet 50 may be positioned at any other suitable location, e.g., aft of the airfoil assembly 18, arranged in a non-axisymmetric manner, etc.

As briefly mentioned above, the engine 10 includes the airfoil assembly 18. The airfoil assembly 18 extends from the cowl 48 and is positioned aft of the rotor assembly 12. The airfoils 20 of the airfoil assembly 18 may be mounted to a stationary frame or other mounting structure and do not rotate relative to the longitudinal axis 14. For reference purposes, FIG. 1 also depicts the forward direction with arrow F, which in turn defines the forward and aft portions of the system. As shown in FIG. 1, the rotor assembly 12 is located forward of the turbomachine 30 in a "puller" configuration, and the exhaust 52 is located aft of the guide airfoils 20. As will be appreciated, the airfoils 20 of the airfoil assembly 18 may be configured for straightening out an airflow (e.g., reducing a swirl in the airflow) from the rotor assembly 12 to increase an efficiency of the engine 10. For example, the airfoils 20 may be sized, shaped, and configured to impart a counteracting swirl to the airflow from the rotor blades 16 so that in a downstream direction aft of both rows of airfoils (e.g., blades 16, airfoils 20) the airflow has a greatly reduced degree of swirl, which may translate to an increased level of induced efficiency. Furthermore, airfoils 20, such as outlet guide vanes, may support one or more of turbomachine 30, the cowl 48, or a nacelle 80 relative to one another, a frame or other fixed structure of the engine 10, or an associated foundation, vehicle, or the like.

Referring still to FIG. 1, it may be desirable that the rotor blades 16, the airfoils 20, or both, incorporate a pitch change mechanism such that the airfoils (e.g., blades 16, airfoils 20, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the rotor blades 16, or to provide a thrust reversing feature, which may be useful in certain operating conditions, such as upon landing an aircraft, or to desirably adjust acoustic noise produced at least in part by the rotor blades 16, the airfoils 20, or aerodynamic interactions from the rotor blades 16 relative to the airfoils 20. More specifically, for the embodiment of FIG. 1, the rotor assembly 12 is depicted with a pitch change mechanism 58 for rotating the rotor blades 16 about their respective pitch axes 60, and the airfoil assembly 18 is depicted with a pitch change mechanism 26 for rotating the airfoils 20 about their respective pitch axes 64.

As is depicted, the rotor assembly 12 is driven by the turbomachine 30, and more specifically, is driven by the low speed spool 45. More specifically, the engine 10 in the embodiment shown in FIG. 1 includes a power gearbox 56, and the rotor assembly 12 is driven by the low speed spool 45 of the turbomachine 30 across the power gearbox 56. The power gearbox 56 may include a gearset for decreasing a rotational speed of the low speed spool 45 relative to the low speed turbine 42, such that the rotor assembly 12 may rotate at a slower rotational speed than the low speed spool 45. In such a manner, the rotating rotor blades 16 of the rotor assembly 12 may rotate around the longitudinal axis 14 and generate thrust to propel engine 10, and hence an aircraft to which it is associated, in a forward direction F. As further shown in FIG. 1, the exemplary engine 10 includes the nacelle 80 circumferentially surrounding at least in part the rotor assembly 12 and turbomachine 30, defining a bypass passage airflow 82 therebetween.

During operation of the ducted engine 10, a volume of air 59 enters the engine 10 through an associated inlet 51 of the nacelle 80 and/or rotor assembly 12. As the volume of air 59 passes across the rotor blades 16, a first portion of the volume of air 59 as indicated by arrows 62 is directed or routed into the bypass airflow passage 82, and a second portion of the volume of air 59 as indicated by arrow 65 is directed or routed into the core flowpath 54, or more specifically into the low speed compressor 44. The ratio between the first portion of air 62 and the second portion of air 65 is commonly known as a bypass ratio. The pressure of the second portion of air 65 is then increased as it is routed through the high speed compressor 34 and into the combustion section 40, where it is mixed with fuel and burned to provide combustion gases 66.

The combustion gases 66 are routed through the high speed turbine 36 where a portion of thermal and/or kinetic energy from the combustion gases 66 is extracted via sequential stages of high speed turbine stator airfoils and high speed turbine rotor blades that are coupled to the high speed spool 35, thus causing the high speed spool 35 to rotate, thereby supporting operation of the high speed compressor 34. The combustion gases 66 are then routed through the low speed turbine 42 where a second portion of thermal and kinetic energy is extracted from the combustion gases 66 via sequential stages of low pressure turbine stator airfoils and low speed turbine rotor blades that are coupled to the low speed spool 45, thus causing the low speed spool 45 to rotate, thereby supporting operation of the low speed compressor 44 and/or rotation of the rotor assembly 12.

The combustion gases 66 are subsequently routed through the jet exhaust nozzle section 52 of the turbomachine 30 to provide propulsive thrust.

Simultaneously, the pressure of the first portion of air 62 is substantially increased as the first portion of air 62 is routed through the bypass airflow passage 82 before it is exhausted from a nozzle exhaust section 76 of the ducted engine 10, also providing propulsive thrust. The high speed turbine 36, the low speed turbine 42, and the jet exhaust nozzle section 52 at least partially define a hot gas path 55 for routing the combustion gases 66 through the turbomachine 30.

It will be appreciated, however, that the exemplary, single rotor, ducted engine depicted in FIG. 1 is by way of example only, and that in other exemplary embodiments, the engine 10 may have any other suitable configuration, including, for example, any other suitable number of shafts or spools, turbines, compressors, etc. Additionally, or alternatively, in other exemplary embodiments, any other suitable gas turbine engine may be provided. For example, in other exemplary embodiments, the gas turbine engine may be an unducted engine, a turbofan engine, a turboshaft engine, a turboprop engine, turbojet engine, etc.

Figure 2:
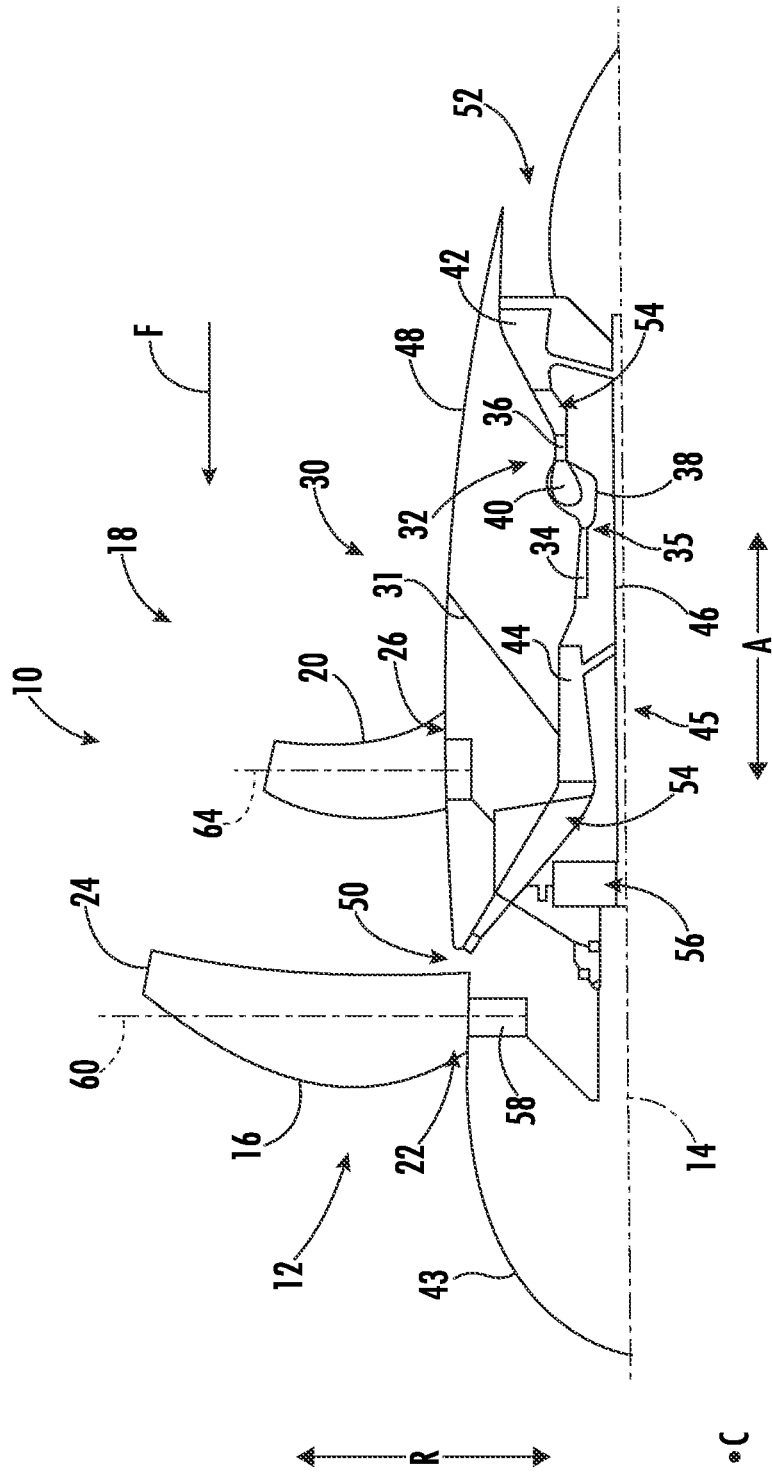
FIG. 2 is a schematic, cross-sectional view of an exemplary, unducted gas turbine engine according to various embodiments of the present subject matter.

For example, referring now to FIG. 2, an elevational, cross-sectional view of another exemplary embodiment of a gas turbine engine 10 is disclosed as may incorporate one or more inventive aspects of the present disclosure. In particular, the exemplary gas turbine engine 10 of FIG. 2 is configured as a single rotor, unducted engine. The exemplary embodiment of FIG. 2 may be configured in substantially the same manner as the exemplary engine 10 described above with respect to FIG. 1, and the same or similar reference numerals may refer to the same or similar parts. For instance, in the depicted embodiment of FIG. 2, the engine 10 includes a rotor assembly 12 which includes an array of airfoils arranged around a central longitudinal axis 14 of engine 10, and more particularly includes an array of rotor blades 16 arranged around the central longitudinal axis 14 of engine 10. The exemplary engine 10 additionally includes a non-rotating airfoil assembly 18 positioned aft of the rotor assembly 12 (i.e., non-rotating with respect to the longitudinal axis 14), which includes an array of airfoils also disposed around longitudinal axis 14, and more particularly includes an array of airfoils 20 disposed around longitudinal axis 14.

However, as will be appreciated, for the open rotor propulsion system embodiment shown in FIG. 2, the engine 10 includes both an array of rotor blades 16 and an array of airfoils 20 which are unducted or open. Further, for the exemplary embodiment of FIG. 2, the engine 10 includes a third stream 31 extending from the core flowpath 54 to a location outside the cowl 48. The third stream 31 may receive air from the core flowpath 54 downstream of at least one stage of compression within the turbomachine 30 (e.g., downstream of a first stage of the low speed compressor 44), and upstream of the high speed compressor 34. In additional or alternative embodiments, at least one array of rotor blades 16 or one array of airfoils 20 may be ducted while at least one array of airfoils 20 rotor blades 16 is in an open arrangement.

As will be appreciated, a gas turbine engine 10 of the present disclosure includes a variety of airfoil assemblies, including, e.g., a fan (such as rotor assembly 12 with fan blades 16) and an outlet guide vane assembly (such as airfoil assembly 18 having airfoils 20/outlet guide vanes). It will further be appreciated that a gas turbine engine 10 of the present disclosure includes airfoil assemblies within a turbomachine 30 of the gas turbine engine 10, such as a stage of inlet guide vanes (e.g., downstream of an inlet 50 and upstream of a low speed compressor 44), a stage of stator vanes (e.g., within a low speed compressor 44), a stage of rotor blades (e.g., within a low speed compressor 44), etc.

Figure 3:
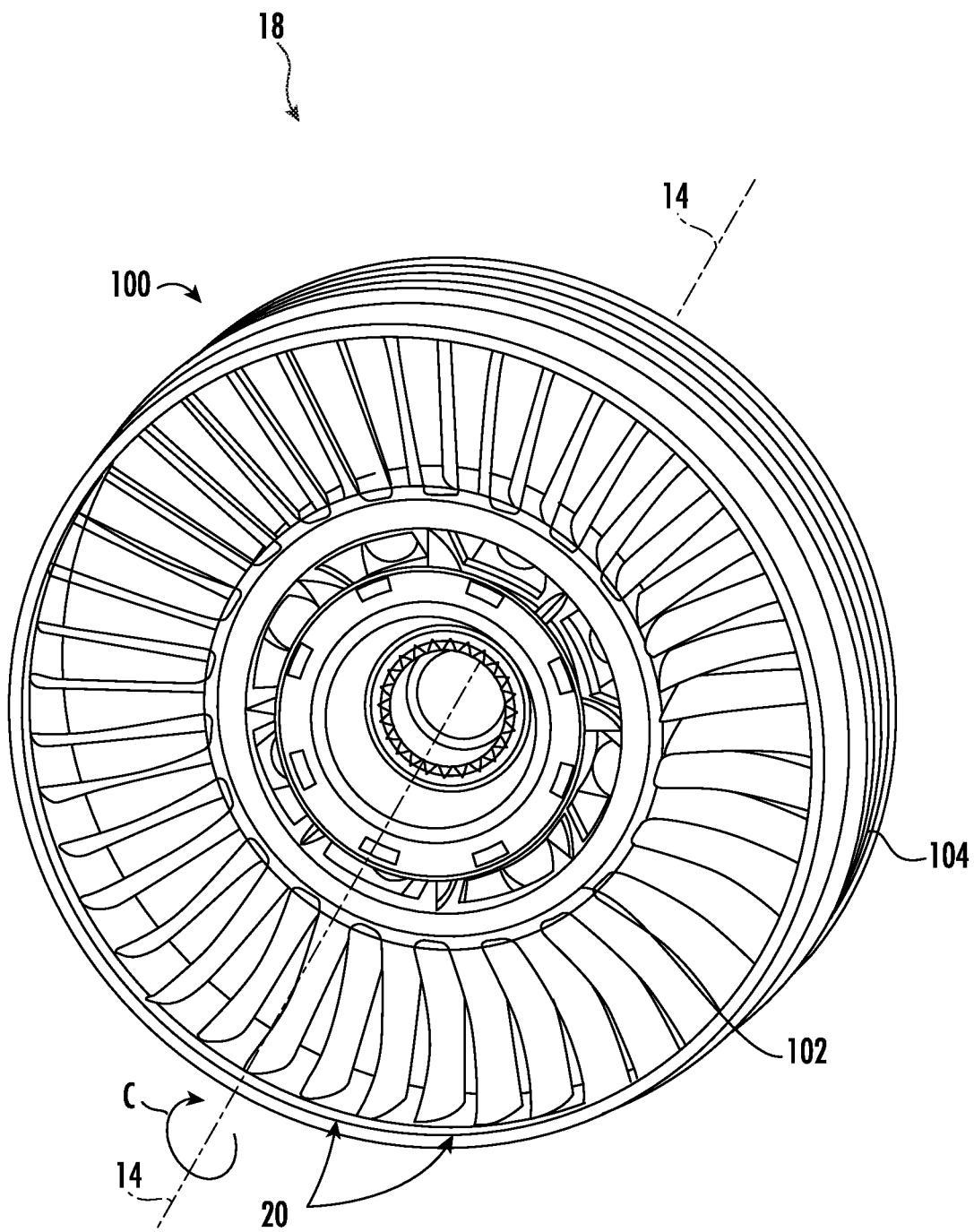
FIG. 3 is a perspective view of an exemplary airfoil assembly according to various embodiments of the present subject matter.

For example, referring now to FIG. 3, a perspective view an exemplary stage 100 of an airfoil assembly of the present disclosure is provided. The airfoil assembly of FIG. 3 is more specifically configured in a similar manner as the exemplary airfoil assembly 18 of FIG. 1. The exemplary stage 100 will be described generally in relation to a ducted gas turbine engine, but the following disclosure may be equally applicable to any other gas turbine engine, e.g., an unducted gas turbine engines, turbofan engines, open prop engines, turbojet engines, power generating gas turbine engines, and the like.

The stage 100 of the airfoil assembly 18 is generally provided with an inner support structure 102, such as a first circular frame member or fan hub frame, an outer support structure 104, such as circular frame member or fan case, and a plurality of airfoils 20, such as outlet guide vanes or counter-swirl airfoils, disposed in a circumferential array about the inner support structure 102 or radially disposed between the inner support structure 102 and outer support structure 104. According to an exemplary embodiment, the airfoil assembly 18 shares a longitudinal axis with longitudinal axis 14 of the engine 10 (FIG. 1). Thus, the inner support structure 102 may be configured to circumscribe the longitudinal axis 14 of the engine 10. It should be appreciated that the inner support structure 102 may be configured to be fixed relative to or by a stationary support, frame, or the like of the ducted engine 10. The outer support structure 104 may be configured to circumscribe the longitudinal axis 14 of the engine 10 and/or the inner support structure 102. In one embodiment, the outer support structure 104 may be configured to be fixed relative to or by a stationary support, frame, or the like of the ducted engine 10. For instance, the outer support structure 104 may be supported and/or fixed at least in part via the plurality of airfoils 20 of the stage 100 of the airfoil assembly 18.

In such a manner, it will be appreciated that the airfoil assembly 18 may be used for mounting outlet guide vanes into a ducted gas turbine engine. In this regard, the airfoils 20 may provide the load path within the stage 100 from the inner support structure 102, e.g., fan hub frame (and thereby turbomachine) and the outer support structure 104, such as a nacelle 80 (see FIG. 1) or a component coupled to or formed with nacelle 80.

In an alternative embodiment, a stage of an airfoil assembly may be configured for use in an unducted gas turbine engine, such as an open rotor gas turbine engine (see FIG. 2). Such a stage for an unducted gas turbine engine may be configured similar to the stage 100 of the airfoil assembly 18 described above with respect to FIG. 3. For instance, an exemplary stage of an airfoil assembly configured for use with an unducted engine may generally include an inner support structure, such as a first circular frame member; a cowl of the engine; a component supported, coupled to, or formed with the cowl; and/or other support structure supported relative to a frame or other fixed structure of the unducted gas turbine engine. The exemplary stage of the airfoil assembly configured for use with an unducted engine generally also includes a plurality of airfoils 20, such as counter-swirl airfoils, disposed in a circumferential array about the inner support structure 102.

However, for various embodiments of such an exemplary airfoil assembly configured for use with an unducted engine, there is no outer support structure. In an additional or alternative embodiment, a stage of an airfoil assembly configured for use with an unducted engine may include an outer support structure extending between two or more of the airfoils at respective distal ends of the airfoils, such as a shroud, a segmented shroud, or the like. In such an embodiment, there may be no outer support structure extending between any two or more consecutive airfoils within the stage. As such, it should be appreciated that one or more outer support structures may only partially circumscribe the plurality of airfoils and/or inner support structure. In such a manner, it will be appreciated that the airfoil(s) may be used for supporting the outer support structure(s) relative to the unducted gas turbine engine.

In an additional or alternative embodiment, the stage of the airfoil assembly may be configured for use in any suitable stator-airfoil assembly of any suitable turbomachine or gas turbine engine. It will be appreciated that the present disclosure is equally applicable to suitably configured stator stages of compressors, turbines, and the like for gas turbine engines.

Referring now to FIGS. 4-7, schematic, cross-sectional views of stages 100 of exemplary airfoil assemblies 18 are illustrated in accordance with aspects of the present disclosure. The exemplary stages 100 of FIGS. 4-7 may be configured in a similar manner as the exemplary stage 100 of FIG. 3. Generally, each of FIGS. 4-7 illustrate embodiments where one or more airfoils 20 of a stage 100 define at least one respective orientation that is different than the remaining airfoils 20 of the stage 100.

The embodiments of FIGS. 4-7 will be described and are generally configured as stages of airfoil assemblies suitable for incorporation within a ducted gas turbine engine, such as the engine 10 described above with reference to FIG. 1. Furthermore, the embodiments of FIGS. 4-7 are described and illustrated as circumscribing a longitudinal axis 14 of an associated gas turbine engine, such as longitudinal axis 14 of the engine 10 of either FIG. 1 or FIG. 2. However, in other embodiments, it should be appreciated that the longitudinal axis 14 of the stage 100 of the airfoil assembly 18 may configured to be distinct from a longitudinal axis of an associated gas turbine engine. For instance, the longitudinal axis of the stage 100 may be radially displaced from and/or define an angle with respect to the longitudinal axis of an associated turbomachine.

Further, for the depicted embodiments, rotor blades 16 of a rotor assembly 12 are positioned axially forward and/or upstream of the stage 100 of the airfoil assembly 18, such as directly upstream of the airfoil assembly 18. In at least one embodiment, the rotor assembly 12 and airfoil assembly 18 may define a single rotor-stator stage of a turbomachine. Generally, the rotor assembly 12 is powered by a rotating spool of the turbomachine, such as either of the low speed spools 45 described with reference to FIGS. 1 and 2 or a similarly configured rotating spool. In the exemplary embodiments of FIGS. 4-7, the rotor assembly 12 and rotor blades 16 may generally be configured as a fan assembly and fan blades, respectively, of a gas turbine engine, such as the fan assembly 12 of the ducted engine 10 of FIG. 1 or a similarly configured ducted gas turbine engine. Additionally, or alternatively, the illustrated rotor assembly 12 and rotor blades 16 may generally be configured as a rotor assembly and rotor blades, respectively, of a gas turbine engine, such as the rotor assembly 12 of unducted engine 10 of FIG. 2, or a similarly configured unducted gas turbine engine.

However, it should be appreciated that the present disclosure is equally applicable to any rotor-stator stage of a turbomachine. For example, rotor blades 16 may include, without limitation, compressor rotor blades, turbine rotor blades, or the like. In such embodiments, the stage 100 of the airfoil assembly 18 may correspond to a stator stage of a compressor (including compressor stator airfoils), a stator stage of turbine (including turbine stator airfoils), or the like, respectively.

Thus, each of the exemplary embodiments of FIGS. 4-7 include an inner support structure 102 circumscribing a respective longitudinal axis 14 of the stage 100. Each of the exemplary embodiments of FIGS. 4-7 also includes a plurality of airfoils 20 extending from the inner support structure 102. The airfoils 20 may be coupled to, fixed to, supported relative to, or the like with respect to the inner support structure 102. The inner support structure 102 itself may be supported, coupled, and/or fixed to relative to a frame, support, other stationary structure, or the like of the gas turbine engine. In one or more embodiments, it should be appreciated that the plurality of airfoils 20 are configured to remain stationary during operation of the associated gas turbine engine 10.

Particularly, as shown in the illustrated embodiments, the respective stages 100 may be configured for use in a ducted gas turbine engine. Thus, each of the embodiments of FIGS. 4-7 are illustrated with an outer support structure 104 (depicted in phantom). In one embodiment, the outer support structure 104 may be configured to be fixed relative to or by a stationary support, structure, frame, nacelle, fan casing, cowl, or the like of the gas turbine engine 10. Additionally, or alternatively, each airfoil 20 within an exemplary stage 100 may extend from the inner support structure 102 to the outer support structure 104. Additionally, or alternatively, one or more airfoils 20, such as all of the airfoils 20, may be coupled to, fixed relative to, or supported relative to the inner support structure 102, the outer support structure 104, or both. For example, in various embodiments, the exemplary stages 100 of FIGS. 4-7 may be configured for use in a gas turbine engine, such as a ducted gas turbine engine, such an engine configured the same or similar to the ducted engine 10 of FIG. 1, such as a turbofan engine. In various embodiments, such as embodiments configured for use in ducted gas turbine engines and/or turbofan engines, the plurality of airfoils 20 may be configured as a plurality of outlet guide vanes.

However, it should be appreciated that the following description is equally applicable to other suitably configured stages and associated airfoil assemblies. For instance, in an additional or alternative embodiment, each exemplary stage 100 depicted in FIGS. 4-7 may be configured for use in an unducted gas turbine engine, such an engine configured the same or similar to the unducted engine 10 of FIG. 2, such as an open rotor gas turbine engine. Thus, each of FIGS. 4-7 are illustrated with the outer support structure 104 in phantom, as the below description is equally applicable to turbomachines that are unducted and/or do not include an outer support structure. In various such embodiments, the plurality of airfoils 20 of the stage 100 may be configured as a plurality of counter-swirl airfoils.

In additional or alternative embodiments, any of the exemplary stages 100 depicted in FIGS. 4-7 may be configured to be utilized in an unducted engine including an outer support structure 106 (depicted in phantom in the exemplary embodiments of FIGS. 4-7). The outer support structure 106 may extend between respective distal ends 124 of two or more airfoils 20 of the stage 100 of the airfoil assembly 18. For example, in one embodiment, the outer support structure 106 may extend generally in a circumferential direction C between two airfoils 20 of the stage 100. Additionally, or alternatively, one or more such airfoils 20 associated with the outer support structure 106, such as all of the airfoils 20 circumscribed or partially circumscribed by the outer support structure 106, may be coupled to, fixed to, support, or the like the outer support structure 106. It should also be appreciated that the outer support structure 106 may extend between non-consecutive airfoils 20 of the stage 100. Thus, the outer support structure 106 may at least partially circumscribe three or more airfoils 20. Such an outer support structure 106 may be coupled to, fixed to, supported by, or the like one or more airfoils 20, such as two airfoils 20, such as the two airfoils 20 defining the circumferential ends of the outer support structure 106, or all of the airfoils 20 circumscribed by the outer support structure 106.

In such a manner, it will be appreciated that one or more of the airfoils 20 circumscribed by the outer support structure 106 may be used for supporting the outer support structure 106 relative to an associated, unducted gas turbine engine and/or associated engine core, such as, for example, turbomachine 30 of FIG. 2 or a similarly configured turbomachine. In an additional or alternative embodiment, there may be no outer support structure 106 extending between any two or more consecutive airfoils 20 within the stage 100. As such, it should be appreciated that one or more outer support structures 106 may only partially circumscribe the airfoils 20 and/or inner support structure 102 within the stage 100. In one embodiment, one or more outer support structures 106 may be configured as one or more shrouds, such as a segmented shroud.

Referring generally still to the exemplary embodiments of FIGS. 4-7, as depicted, the plurality of airfoils 20 of the stage 100 may include, at least a first airfoil 120, a second airfoil 220, and a third airfoil 320. However, it should be appreciated that the stage 100 may include any suitable number of airfoils 20, such as four or more, 10 or more, 20 or more, etc., and that only a portion of the airfoils 20 of the respective, exemplary stages 100 are depicted in FIGS. 4-7. In several embodiments, the first airfoil 120, the second airfoil 220, and the third airfoil 320 may be consecutive airfoils within the respective stage 100 of the airfoil assembly 18. However, in additional or alternative embodiments, one or more airfoils 20 may be positioned in generally the circumferential direction (C) between the first airfoil 120 and the second airfoil 220 and/or between the second airfoil 220 and the third airfoil 320 in the stage 100.

Generally, each airfoil 20 of the depicted embodiments includes a root end 122 and a distal end 124 (depicted only with respect to root end 122 and distal end 124 of first airfoil 120 for the sake of clarity). Each airfoil 20 may include a body 126 (depicted only with respect to body 126 of first airfoil 120 for the sake of clarity) extending between the root end 122 and the distal end 124 along a span of the respective airfoil 20. The body 126 of each airfoil 20 may generally define an airfoil profile. For example, as illustrated with respect to first airfoil 120 of FIGS. 4-7, the body 126 of each airfoil 20 may include a leading edge 128, a trailing edge 130, a suction side 132 extending between the leading edge 128 and the trailing edge 130 and between the root end 122 and distal end 124, and a pressure side 134 extending between the leading edge 128 and the trailing edge 130 and between the root end 122 and distal end 124. Each airfoil 20 generally defines a chord extending between the leading edge 128 and trailing edge 130. In some embodiments, the chord of one or more of the airfoils 20 of a stage 100 may be the same along the respective span of the body 126. Additionally, or alternatively, the direction of the chord may change along the respective span of one or more airfoils 20, e.g., airfoils configured to have a changing dihedral, sweep, or twist along respective spans of the airfoils.

In accordance with various aspects of the present disclosure, an exemplary stage 100 of an airfoil assembly 18 may include two or more airfoils 120 defining at least one distinct and/or different orientation with respect to each other. For example, two or more airfoils 120 may define different sweep angles (FIG. 4), two or more airfoils 120 may define different lean angles (FIG. 5), two or more airfoils 120 may define different axial positions (FIG. 6), two or more airfoils 120 may define different hoop spacings (FIG. 7), or any combination of the preceding. Each of these embodiments is described in more detail below.

The rotor assembly 12 generally provides and/or generates downstream flow of a working fluid, such as incoming atmospheric air. Each rotor blades 16, while rotating, generates a sound profile. Furthermore, such flow of the working fluid creates one or more distinct sound profiles due to the impingement and/or interaction of the working fluid with the respective airfoils 20 of the stage 100 of the airfoil assembly 18. The accumulation of these sound profiles often results in undesirable, unacceptable, or an unnecessarily high level of sound output from the associated turbomachine. However, various aspects of the present disclosure may alleviate undesirable noise levels from gas turbine engines by generally utilizing the phenomena of destructive interference. For instance, two or more of the airfoils 20 of the stage 100 may be oriented differently such that the sound profiles associated with any two or more airfoils 20 or rotor blades 16 interact in order to reduce or eliminate a resulting noise level produced by the associated stage 100 of the airfoil assembly 18, an associated rotor-stator stage, or a total sound output from an associated turbomachine.

In various embodiments, the first airfoil 120 and the second airfoil 220 of the stage 100 have at least one different orientation such that a phase shift is generated between the sound profiles generated by the first airfoil 120 and the second airfoil 220 during operation of the associated gas turbine engine 10. In additional or alternative embodiments, the first airfoil 120 and the second airfoil 220 of the stage 100 have at least one different orientation such that a phase shift is generated between the sound profiles of one or both of the first airfoil 120 and second airfoil 220 and an additional airfoil 20, such as the third airfoil 320, as shown, during operation of the associated gas turbine engine 10. In additional or alternative embodiments, the first airfoil 120 and the second airfoil 220 of the stage 100 have at least one different orientation such that a phase shift is generated between the sound profiles generated by one or both of the first airfoil 120 and the second airfoil 220 and one or more of the rotating rotor blades 16.

It should be appreciated that such phase shift may be determined with reference to one or more predetermined locations relative to the stage 100 and/or an associated gas turbine engine. For example, the first airfoil 120 and second airfoil 220 may have at least one different orientation such that destructive interference occurs between any of the above airfoils' and/or blades' sound profiles at the stage 100 of the airfoil assembly 18, at the airfoil assembly 18, at an inlet of an associated gas turbine engine (e.g., an inlet of a ducted gas turbine engine, such as inlet 51 illustrated in FIG. 1), at an exhaust of an associated gas turbine engine (e.g., an exhaust nozzle of a ducted gas turbine engine, such as jet exhaust nozzle section 52 or nozzle exhaust section 76 illustrated in FIG. 1), or at known position or distance relative to the first airfoil 120 and second airfoil 220 (e.g., a passenger compartment or portion thereof of an associated vehicle or an operator's position of an associated gas turbine engine).

In additional or alternative embodiments, the first airfoil 120 and the second airfoil 220 of the stage 100 have at least one different orientation such that an airfoil array stiffness of the airfoil assembly 18 falls within a predetermined range. For instance, two or more differently oriented airfoils 20 (such as first airfoil 120, second airfoil 220, and or third airfoil 320) may alter the total airfoil array stiffness or the airfoil array stiffness at one or more discrete locations of airfoil assembly 18. For example, the first airfoil 120 may define a first stiffness and the second airfoil 220 may define a second stiffness. The first stiffness may be at least about 5% greater than the second stiffness, such as at least about 10% greater, such as at least about 15% greater, such as up to 200% greater (calculated by: (first stiffness−second stiffness)/first stiffness; where stiffness is measured in Newtons per meter). The first and second stiffnesses are measured in the same direction.

It should be appreciated that such differently oriented airfoils 20 may be utilized to adjust the total stiffness with respect to the axial direction A, the circumferential direction C, or a combination of the two and/or such local stiffness(es) at one or more locations of the airfoil assembly 18.

Figure 4:
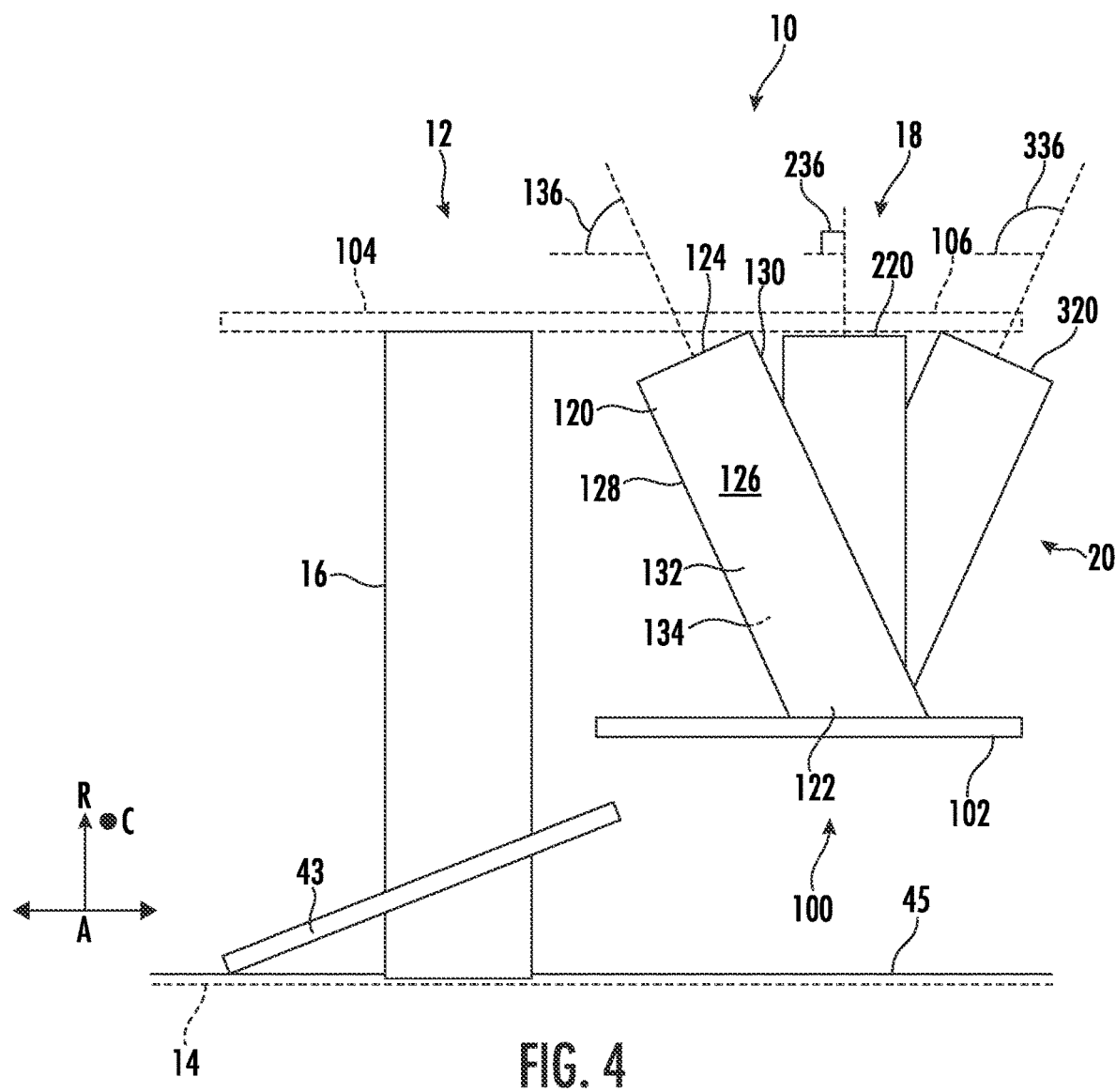
FIG. 4 is a schematic, cross-sectional view of a stage of an airfoil assembly in accordance with an exemplary aspect of the present disclosure.

Referring now particularly to FIG. 4, a close-up, cross-sectional, schematic view of a stage 100 of an airfoil assembly 18 is illustrated in accordance with an exemplary embodiment of the present disclosure. More particularly, FIG. 4 is a schematic view of the stage 100 taken along a plane defined by the radial direction R and the axial direction A at a point along the circumferential direction C. As shown, the stage 100 may include two or more airfoils 20 that define discrete sweep angles (e.g., a first sweep angle 136 of first airfoil 120, a second sweep angle 236 of second airfoil 220, a third sweep angle 336 of third airfoil 320, etc.). A sweep angle of an airfoil 20 of the stage 100 generally corresponds to an angle defined between the direction of the span of the respective airfoil 20 and the direction of the longitudinal axis 14 in the plane defined by the axial direction A and the radial direction R. For example, as illustrated with respect to first airfoil 120, first sweep angle 136 is defined between a direction of a span of the first airfoil 120 and the longitudinal axis 14 in the plane defined by the axial direction A and the radial direction R.

It should be appreciated that each airfoil 20 of the stage 100 may define a discrete sweep angle. In additional or alternative embodiments, two or more airfoils 20 may define the same sweep angle (e.g., first sweep angle 136) while two or more airfoils 20 define the same sweep angle (e.g., second sweep angle 236). Additionally, or alternatively, the stage 100 may include one or more pairings, groupings, or individual further airfoils 20 defining any number of discrete sweep angles desired or required.

In the embodiment depicted, the first sweep angle 136 is at least 5% different than the second sweep angle 236, such as at least 10% different, such as at least 15% different, such as at least 20% different, such as up to 90% different (calculated by: (first sweep angle−second sweep angle)/first sweep angle).

Further, for the embodiment depicted, the first sweep angle 136 is less than the second sweep angle 236, and the second sweep angle 236 is less than the third sweep angle 336. The difference between the second and third sweep angles 236, 336 may be in a similar range outlined above for the first and second sweep angles 136, 236.

It should be appreciated that each airfoil 20 of the stage 100 may define a discrete sweep angle. In additional or alternative embodiments, two or more airfoils 20 may define a first common sweep angle (e.g., first sweep angle 136) while two or more other airfoils 20 define a different common sweep angle (e.g., second sweep angle 236). Additionally, or alternatively, the stage 100 may include one or more pairings, groupings, or individual further airfoils 20 defining any number of discrete sweep angle desired or required.

Figure 5:
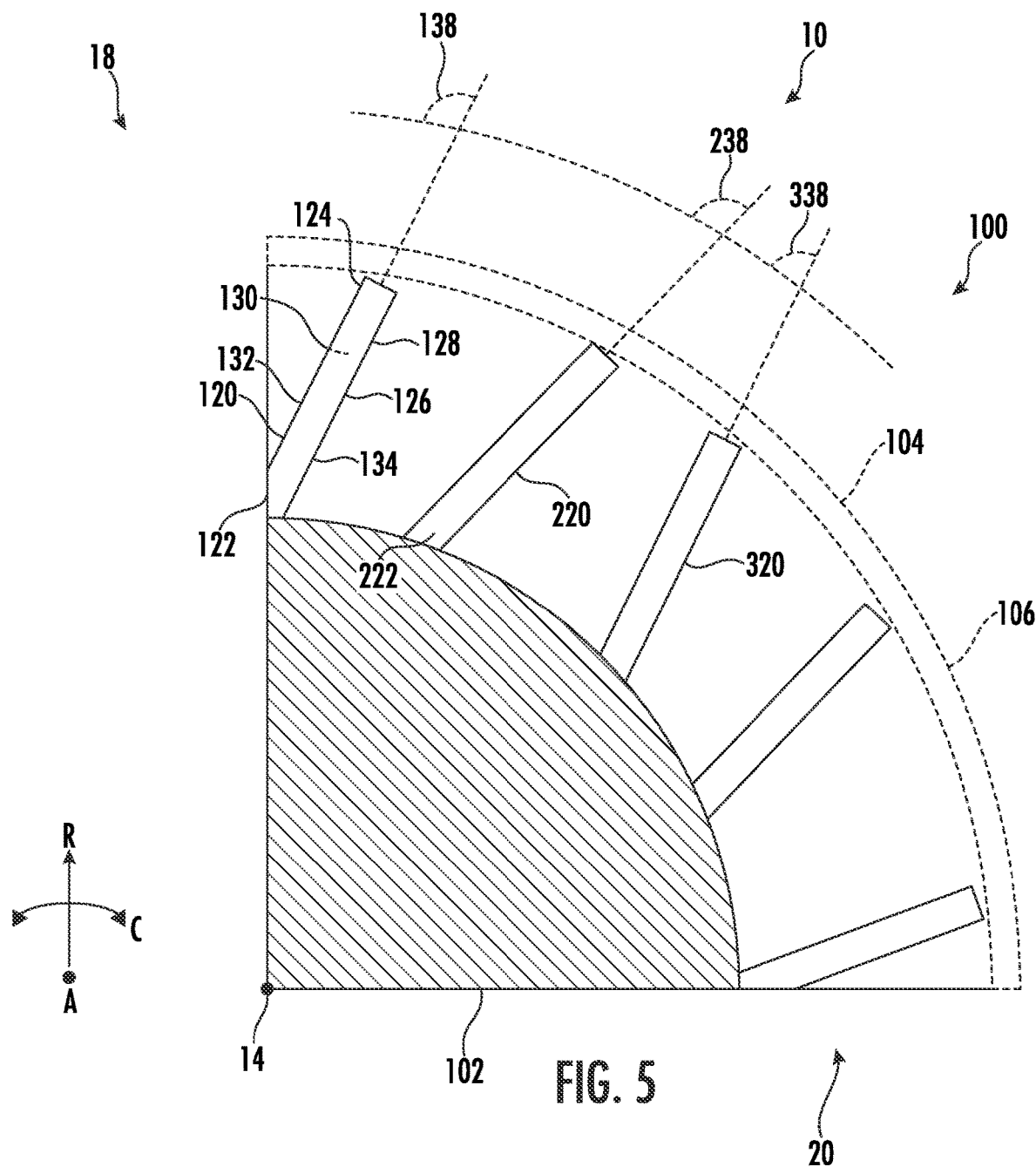
FIG. 5 is a schematic, cross-sectional view of a stage of an airfoil assembly in accordance with another exemplary aspect of the present disclosure.

Referring now particularly to FIG. 5, a close-up, cross-sectional, schematic view of a stage 100 of an airfoil assembly 18 is illustrated in accordance with an alternative or additional exemplary embodiment of the present disclosure. More particularly, FIG. 5 is a schematic view of the stage 100 taken along a plane defined by the radial direction R and the circumferential direction C at a point along the axial direction A. As shown, the stage 100 may include two or more airfoils 20 that define discrete lean angles (e.g., a first lean angle 138 of first airfoil 120, a second lean angle 238 of second airfoil 220, a third lean angle 338 of third airfoil 320, etc.). A lean angle of an airfoil 20 of the stage 100 generally corresponds to an angle defined between the direction of the span of the respective airfoil 20 and the circumferential direction C in the plane defined by the radial direction R and the circumferential direction C. For example, as illustrated with respect to first airfoil 120, first lean angle 138 is defined between a direction a span of the first airfoil 120 and the circumferential direction C in the plane defined by the radial direction R and the circumferential direction C.

In the embodiment depicted, the first lean angle 138 is at least 5% different than the second lean angle 238, such as at least 10% different, such as at least 15% different, such as at least 20% different, such as up to 90% different (calculated by: (first lean angle−second lean angle)/first lean angle).

Further, for the embodiment depicted, the first lean angle 138 is less than the second lean angle 238, and the second lean angle 238 is less than the third lean angle 338. The difference between the second and third lean angles 238, 338 may be in a similar range outlined above for the first and second lean angle 138, 238.

It should be appreciated that each airfoil 20 of the stage 100 may define a discrete lean angle. In additional or alternative embodiments, two or more airfoils 20 may define a first common lean angle (e.g., first lean angle 138) while two or more other airfoils 20 define a different common lean angle (e.g., second lean angle 238). Additionally, or alternatively, the stage 100 may include one or more pairings, groupings, or individual further airfoils 20 defining any number of discrete lean angles desired or required.

Figure 6:
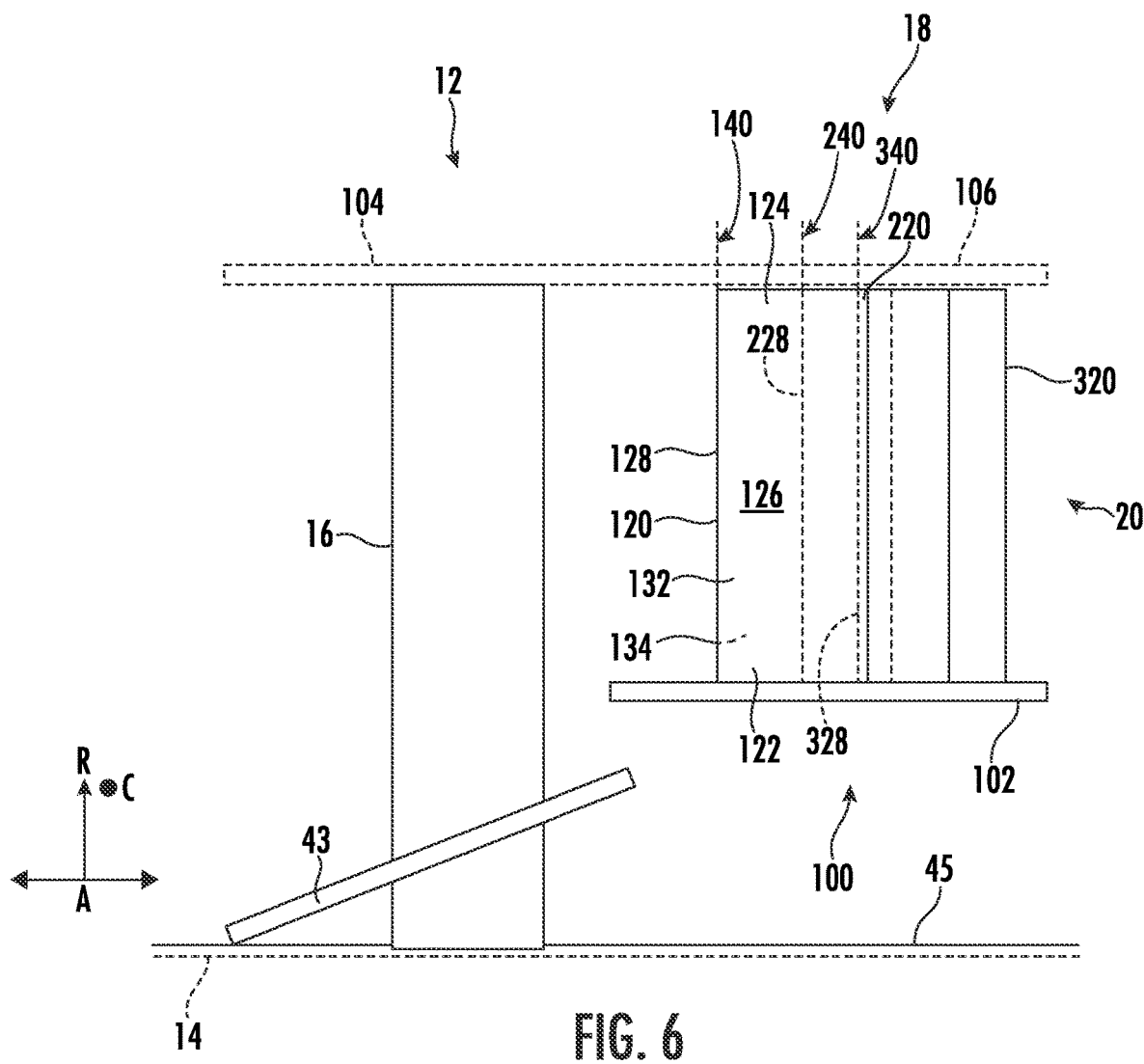
FIG. 6 is a schematic, cross-sectional view of a stage of an airfoil assembly in accordance with another exemplary aspect of the present disclosure.

Referring now particularly to FIG. 6, a close-up, cross-sectional, schematic view of a stage 100 of an airfoil assembly 18 is illustrated in accordance with an additional or alternative exemplary embodiment of the present disclosure. More particularly, FIG. 6 is a schematic view of the stage 100 taken along a plane defined by the radial direction R and the axial direction A at a point along the circumferential direction C. As shown, the stage 100 may include two or more airfoils 20 positioned at discrete axial positions (e.g., a first axial position 140 of first airfoil 120, a second axial position 240 of second airfoil 220, a third axial position 340 of third airfoil 320, etc.). An axial position of an airfoil 20 of the stage 100 generally corresponds to a position of the respective airfoil 20 along the longitudinal axis 14, such as in the depicted plane defined by the axial direction A and the radial direction R. More specifically, as used herein, the axial position refers to a forward-most point of the airfoil, e.g., a forward-most point of a leading edge of the airfoil. For example, the first axial position 140 is a forward-most point of the first leading edge 128 of the first airfoil, the second axial position 240 is a forward-most point of a second leading edge 228 of the second airfoil 220, and the third axial position 340 is a forward-most point of a third leading edge 328 of the third airfoil 320.

In the embodiment depicted, the first axial position 140 is offset from the second axial position 240 by at least about 0.25 inches, such as by at least about 0.75 inches, such as by at least about 1.25 inches, such as by at least about 2 inches, such as by at least about 2.5 inches, such as by at least about 4 inches, such as by up to about 20 inches.

Further, for the embodiment depicted, the first axial position 140 is forward of the second axial position 240, which is forward of the third axial position 340. The difference between the second and third axial positions 240, 340 may be in a similar range outlined above for the first and second axial positions 140, 240.

It should be appreciated that each airfoil 20 of the stage 100 may be positioned at a discrete axial position. In additional or alternative embodiments, two or more airfoils 20 may be positioned at a first common axial position (e.g., first axial position 140) while two or more airfoils 20 may be positioned at a second common axial position (e.g., second axial position 240). Additionally, or alternatively, the stage 100 may include one or more pairings, groupings, or individual further airfoils 20 positioned at any number of discrete axial positions desired or required.

Referring now particularly to FIG. 7, a close-up, cross-sectional, schematic view of a stage 100 of an airfoil assembly 18 is illustrated in accordance with an alternative or additional exemplary embodiment of the present disclosure. More particularly, FIG. 7 is a schematic view of the stage 100 taken along a plane defined by the radial direction R and the circumferential direction C at a point along the axial direction A. As shown, the stage 100 may include two or more airfoils 20 that define discrete hoop spacings (e.g., a first hoop spacing between a first hoop position 142 of first airfoil 120 and a hoop position of the next consecutive airfoil 20, a second hoop spacing between a second hoop position 242 of second airfoil 220 and a hoop position of the next consecutive airfoil 20, a third hoop spacing between a third hoop position 342 of third airfoil 320 and a hoop position of the next consecutive airfoil 20, etc.).

A hoop spacing of an airfoil 20 of the stage 100 generally corresponds to a difference between a circumferential position of the respective airfoil 20 and a circumferential position of the next consecutive airfoil 20 in the circumferential direction C of the next consecutive airfoil 20. Such hoop spacing may generally be defined as a difference in an angular position of the respective airfoil 20 and an angular position of the next consecutive airfoil 20. Additionally, or alternatively, such hooping spacing may be defined as a circumferential distance between the circumferential position of the respective airfoil 20 and the circumferential position of the next consecutive airfoil 20. It should be appreciated that such hoop spacing may be determined at the same radial distance of both the respective airfoil 20 and the next consecutive airfoil 20 with respect to the longitudinal axis 14. Furthermore, the hoop spacing of each airfoil 20 of the stage 100 may be determined at the same radial distance with respect to the longitudinal axis 14.

For example, as illustrated with respect to first airfoil 120, the first hoop spacing may be defined as the difference in the angular position of the first hoop position 142 (such as at the root 122) and the angular position of the second hoop position 242 (such as at a root 222 of second airfoil 220). Additionally, or alternatively, the first hoop spacing may be defined as the circumferential distance between the first hoop position 142 and the second hoop position 242 (such as a circumferential distance between the root 122 and the root 222).

It should be appreciated that each airfoil 20 of the stage 100 may define a discrete hoop spacing with respect to the next consecutive airfoil 20 of the stage 100. In additional or alternative embodiments, two or more airfoils 20 may define the same hoop spacing (e.g., the first hoop spacing) while two or more airfoils 20 define the same hoop spacing (e.g., second hoop spacing). Additionally, or alternatively, the stage 100 may include one or more pairings, groupings, or individual further airfoils 20 defining any number of discrete hoop spacings desired or required.

In accordance with the above disclosure, it will be appreciated that inclusion of an airfoil assembly having a first airfoil (defining a first sweep angle, a first axial position, and a first lean angle) and a second airfoil (defining a second sweep angle, a second axial position, a second hoop spacing, and a second lean angle), wherein a second sweep angle is different than the first sweep angle, the second axial position is different than the first axial position, the second lean angle is different than the first lean angle, or a combination thereof, may result in a more favorable sound profiled downstream of the airfoil assembly. Notably, the inventors of the present disclosure have found that varying the first and second axial positions may be particularly relevant in a ducted arrangement given the airflow characteristics in a ducted environment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

An airfoil assembly for a gas turbine engine, the gas turbine engine defining an axial direction (A), a longitudinal axis extending along the axial direction (A), a radial direction (R), and a circumferential direction (C) relative to the longitudinal axis, the airfoil assembly including: an inner support structure configured to circumscribe the longitudinal axis of the gas turbine engine; an outer support structure configured to circumscribe the longitudinal axis of the gas turbine engine, the outer support structure circumscribing the inner support structure; and a stage including a plurality of airfoils extending from the inner support structure towards the outer support structure, the plurality of airfoils including: a first airfoil defining a first sweep angle, a first axial position, and a first lean angle; and a second airfoil defining a second sweep angle, a second axial position, a second hoop spacing, and a second lean angle, wherein the second sweep angle is different than the first sweep angle, the second axial position is different than the first axial position, the second lean angle is different than the first lean angle, or a combination thereof.

The airfoil assembly of one or more of these clauses, wherein the inner support structure is configured to be fixed relative to a stationary support of the gas turbine engine, and wherein the plurality of airfoils are configured to remain stationary during operation of the gas turbine engine.

The airfoil assembly of one or more of these clauses, wherein the first airfoil and the second airfoil are each configured to reduce noise generated by the airfoil assembly via destructive interference during operation of the gas turbine engine.

The airfoil assembly of one or more of these clauses, wherein the second axial position is different than the first axial position.

The airfoil assembly of one or more of these clauses, wherein the second sweep angle is different than the first sweep angle.

The airfoil assembly of one or more of these clauses, wherein the second lean angle is different than the first lean angle.

The airfoil assembly of one or more of these clauses, wherein the first airfoil and the second airfoil are consecutive airfoils in the circumferential direction (C) of the stage of the airfoil assembly.

The airfoil assembly of one or more of these clauses, wherein at least one additional airfoil of the plurality of airfoils is positioned circumferentially between the first airfoil and the second airfoil.

The airfoil assembly of one or more of these clauses, wherein the outer support structure of the airfoil assembly is an outer support structure configured to be fixed to a support of the gas turbine engine, and wherein each airfoil of the plurality of airfoils extends from the inner support structure to the outer support structure.

The airfoil assembly of one or more of these clauses, wherein the outer support structure of the airfoil assembly is a shroud circumscribing the plurality of airfoils, and wherein the plurality of airfoils are rotatable fan blades.

A gas turbine engine defining an axial direction (A), a longitudinal axis extending along the axial direction (A), a radial direction (R), and a circumferential direction (C) relative to the longitudinal axis, the gas turbine engine including: a turbomachine; a fan assembly rotatable by the turbomachine; and an airfoil assembly configured with the turbomachine, the fan assembly, or both, the airfoil assembly including: an inner support structure circumscribing the longitudinal axis of the gas turbine engine; an outer support structure circumscribing the longitudinal axis of the gas turbine engine and the inner support structure; and a stage including a plurality of airfoils extending from the inner support structure towards the outer support structure, the plurality of airfoils including: a first airfoil defining a first sweep angle, a first axial position, and a first lean angle; and a second airfoil defining a second sweep angle, a second axial position, a second hoop spacing, and a second lean angle, wherein the second sweep angle is different than the first sweep angle, the second axial position is different than the first axial position, the second lean angle is different than the first lean angle, or a combination thereof.

The gas turbine engine of one or more of these clauses, further including: an outer nacelle, and wherein the outer support structure is an outer support structure coupled to or integrated into the outer nacelle, wherein each airfoil of the plurality of airfoils extends from the inner support structure to the outer support structure.

The gas turbine engine of one or more of these clauses, wherein the fan assembly includes a fan, wherein the fan includes a plurality of fan blades, and wherein the outer nacelle circumscribes the plurality of fan blades.

The gas turbine engine of one or more of these clauses, wherein the plurality of airfoils is plurality of outlet guide vanes.

The gas turbine engine of one or more of these clauses, wherein the second lean angle is different than the first lean angle, wherein the second sweep angle is different than the first sweep angle, or both.

The gas turbine engine of one or more of these clauses, wherein the airfoil assembly is positioned within the turbomachine.

An airfoil assembly for a gas turbine engine, the gas turbine engine defining an axial direction (A), a longitudinal axis extending along the axial direction (A), a radial direction (R), and a circumferential direction (C) relative to the longitudinal axis, the airfoil assembly including: an inner support structure configured to circumscribe the longitudinal axis of the gas turbine engine; and a stage including a plurality of airfoils extending from the inner support structure outwardly along the radial direction (R), the plurality of airfoils being a plurality of unducted airfoils and including: a first airfoil defining a first sweep angle and a first lean angle; and a second airfoil defining a second sweep angle and a second lean angle, wherein the second sweep angle is different than the first sweep angle, the second lean angle is different than the first lean angle, or a combination thereof.

The airfoil assembly of one or more of these clauses, wherein the gas turbine engine including an unducted fan, and wherein the plurality of airfoils is plurality of outlet guide vanes for the unducted fan.

The airfoil assembly of one or more of these clauses, wherein the second lean angle is different than the first lean angle.

The airfoil assembly of one or more of these clauses, wherein the second sweep angle is different than the first sweep angle.

What is claimed is:

1. An airfoil assembly for a gas turbine engine, the gas turbine engine defining an axial direction, a longitudinal axis extending along the axial direction, a radial direction, and a circumferential direction relative to the longitudinal axis, the airfoil assembly located aft of rotor blades of a fan assembly, the airfoil assembly comprising:
an inner support structure configured to circumscribe the longitudinal axis of the gas turbine engine;
an outer support structure configured to circumscribe the longitudinal axis of the gas turbine engine, the outer support structure circumscribing the inner support structure; and
a stage comprising a plurality of outlet guide vanes extending from the inner support structure towards the outer support structure, the plurality of outlet guide vanes comprising:
a first outlet guide vane defining a first sweep angle, a first axial position as measured at a forward-most point of the first outlet guide vane, and a first lean angle; and
a second outlet guide vane defining a second sweep angle, a second axial position as measured from a forward most point of the second outlet guide vane, and a second lean angle,
wherein the first axial position is forward of the second axial position with respect to the axial direction of the gas turbine engine, wherein the second sweep angle is different than the first sweep angle, and the second lean angle is different than the first lean angle.

2. The airfoil assembly of claim 1, wherein the inner support structure is configured to be fixed relative to a stationary support of the gas turbine engine, and wherein the plurality of outlet guide vanes are configured to remain stationary during operation of the gas turbine engine.

3. The airfoil assembly of claim 1, wherein the first outlet guide vane and the second outlet guide vane are each configured to reduce noise generated by the airfoil assembly via destructive interference during operation of the gas turbine engine.

4. The airfoil assembly of claim 1, wherein the second sweep angle is different than the first sweep angle.

5. The airfoil assembly of claim 1, wherein the second lean angle is different than the first lean angle.

6. The airfoil assembly of claim 1, wherein the first outlet guide vane and the second outlet guide vane are consecutive airfoils in the circumferential direction of the stage of the airfoil assembly.

7. The airfoil assembly of claim 1, wherein at least one additional outlet guide vane of the plurality of outlet guide vanes is positioned circumferentially between the first airfoil and the second airfoil.

8. The airfoil assembly of claim 1, wherein the outer support structure of the airfoil assembly is an outer support structure configured to be fixed to a support of the gas turbine engine, and wherein each outlet guide vane of the plurality of outlet guide vanes extends from the inner support structure to the outer support structure.

9. The airfoil assembly of claim 1, wherein the gas turbine engine is an unducted fan engine.

10. A gas turbine engine defining an axial direction, a longitudinal axis extending along the axial direction, a radial direction, and a circumferential direction relative to the longitudinal axis, the gas turbine engine comprising:
a turbomachine;
a fan assembly rotatable by the turbomachine, the fan assembly including rotor blades; and
an airfoil assembly configured with the turbomachine, the fan assembly, or both, the airfoil assembly located aft of the rotor blades, the airfoil assembly comprising:
an inner support structure circumscribing the longitudinal axis of the gas turbine engine;
an outer support structure circumscribing the longitudinal axis of the gas turbine engine and the inner support structure; and
a stage comprising a plurality of outlet guide vanes extending from the inner support structure towards the outer support structure, the plurality of outlet guide vanes comprising:
a first outlet guide vane defining a first sweep angle, a first axial position as measured at a forward-most point of the first outlet guide vane, and a first lean angle; and
a second outlet guide vane defining a second sweep angle, a second axial position as measured at a forward-most point of the second outlet guide vane, and a second lean angle,
wherein the first axial position is forward of the second axial position with respect to the axial direction of the gas turbine engine, wherein the second sweep angle is different than the first sweep angle, and the second lean angle is different than the first lean angle.

11. The gas turbine engine of claim 10, further comprising:
an outer nacelle, and wherein the outer support structure is an outer support structure coupled to or integrated into the outer nacelle, wherein each outlet guide vane of the plurality of outlet guide vanes extends from the inner support structure to the outer support structure.

12. The gas turbine engine of claim 11, wherein the fan assembly comprises a fan, wherein the fan comprises a plurality of fan blades, and wherein the outer nacelle circumscribes the plurality of fan blades.

13. The gas turbine engine of claim 10, wherein the second lean angle is different than the first lean angle, and wherein the second sweep angle is different than the first sweep angle.

14. The gas turbine engine of claim 10, wherein the airfoil assembly is positioned within the turbomachine.

15. The gas turbine engine of claim 10, wherein the gas turbine engine is an unducted fan engine.

16. An airfoil assembly for a gas turbine engine, the gas turbine engine defining an axial direction, a longitudinal axis extending along the axial direction, a radial direction, and a circumferential direction relative to the longitudinal axis, the airfoil assembly located aft of rotor blades of a fan assembly, the airfoil assembly comprising:
an inner support structure configured to circumscribe the longitudinal axis of the gas turbine engine; and
a stage comprising a plurality of airfoils extending from the inner support structure outwardly along the radial direction, the plurality of airfoils being a plurality of unducted airfoils and comprising:
a first airfoil defining a first axial position as measured at a forward-most point of the airfoil, a first sweep angle, and a first lean angle; and
a second airfoil defining a second axial position as measured at a forward-most point of the second airfoil, a second sweep angle, and a second lean angle,
wherein the first axial position is forward of the second axial position with respect to the axial direction of the gas turbine engine, and wherein the second lean angle is different than the first lean angle.

17. The airfoil assembly of claim 16, wherein the gas turbine engine comprises an unducted fan.

18. The airfoil assembly of claim 16, wherein the second sweep angle is different than the first sweep angle.

19. An airfoil assembly for a gas turbine engine, the gas turbine engine defining an axial direction, a longitudinal axis extending along the axial direction, a radial direction, and a circumferential direction relative to the longitudinal axis, the airfoil assembly located aft of rotor blades of a fan assembly, the airfoil assembly comprising:
an inner support structure configured to circumscribe the longitudinal axis of the gas turbine engine; and
a stage comprising a plurality of airfoils extending from the inner support structure outwardly along the radial direction, the plurality of airfoils being a plurality of unducted airfoils and comprising:
a first airfoil defining a first axial position as measured at a forward-most point of the airfoil, a first sweep angle, and a first lean angle; and
a second airfoil defining a second axial position as measured at a forward-most point of the second airfoil, a second sweep angle, and a second lean angle,
wherein the first axial position is forward of the second axial position with respect to the axial direction of the gas turbine engine, and wherein the second sweep angle is different than the first sweep angle.

* * * * *